(12) United States Patent
Velusamy et al.

(10) Patent No.: US 9,516,572 B1
(45) Date of Patent: Dec. 6, 2016

(54) SERVER CONTROL OF USER EQUIPMENT HAVING A CURRENT ACCESS POINT NAME (APN) DATA SET

(71) Applicant: Sprint Communications Company L.P., Overland Park, KS (US)

(72) Inventors: Saravana Velusamy, Olathe, KS (US); Rajil Malhotra, Olathe, KS (US); Jasinder Pal Singh, Olathe, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/873,010

(22) Filed: Oct. 1, 2015

(51) Int. Cl.
*H04W 36/32* (2009.01)
*H04W 4/02* (2009.01)
*H04W 88/16* (2009.01)

(52) U.S. Cl.
CPC ............... *H04W 36/32* (2013.01); *H04W 4/02* (2013.01); *H04W 88/16* (2013.01)

(58) Field of Classification Search
None
See application file for complete search history.

(56) References Cited

U.S. PATENT DOCUMENTS

| 8,594,016 | B2 | 11/2013 | Lair |
|---|---|---|---|
| 2008/0102896 | A1 | 5/2008 | Wang et al. |
| 2009/0305707 | A1 | 12/2009 | Pudney |
| 2011/0026463 | A1 | 2/2011 | Lair |
| 2012/0082029 | A1 | 4/2012 | Liao |
| 2012/0238236 | A1 | 9/2012 | Liao |
| 2013/0315072 | A1 | 11/2013 | Hietalahti et al. |
| 2013/0344890 | A1* | 12/2013 | Hahn .............. H04W 60/00 455/456.1 |
| 2014/0153544 | A1* | 6/2014 | Lu .................... H04W 8/26 370/331 |
| 2014/0204901 | A1 | 7/2014 | Hedman et al. |
| 2014/0211728 | A1 | 7/2014 | Zembutsu et al. |
| 2014/0286307 | A1 | 9/2014 | Chen et al. |
| 2015/0045025 | A1 | 2/2015 | Lim et al. |

FOREIGN PATENT DOCUMENTS

| CN | 103843398 A | 4/2014 |
|---|---|---|
| EP | 2764724 A1 | 4/2013 |
| WO | 2013050061 A1 | 4/2013 |
| WO | 2013104750 A2 | 7/2013 |
| WO | 2014160978 A2 | 10/2014 |

* cited by examiner

Primary Examiner — Diane Mizrahi (57) ABSTRACT

A mobility server receives a tracking area update from User Equipment (UE) indicating UE Identifier (ID) and current tracking area ID and responsively determines if the current tracking area ID is new tracking area ID. If current tracking area ID comprises new tracking area ID, then the mobility server updates a tracking area database with new tracking area ID. The mobility server translates UE ID and current tracking area ID into candidate Access Point Name (APN) data set and determines if candidate APN data set is a new APN data set. If candidate APN data set comprises new APN data set, then the mobility server transfers an instruction for UE to perform a wireless reattachment to obtain candidate APN data set and receives an attachment request from UE indicating UE ID and current tracking area ID and responsively transfers candidate APN data set to a data network gateway.

20 Claims, 6 Drawing Sheets

SERVER CONTROL OF USER EQUIPMENT HAVING A CURRENT ACCESS POINT NAME (APN) DATA SET

TECHNICAL BACKGROUND

Wireless communication devices include wireless access systems which provide a user device wireless access to communication services over wireless links. Wireless communication systems exchange user communications between wireless communication devices and service providers for the communication services. Communication services include voice calls, data exchange, web pages, streaming media, or text messages, among other communication services.

Wireless communication devices are located in an initial tracking area when registering and attaching to communication networks.

Upon attachment, a wireless communication device receives an Access Point Name (APN) indicating the gateway between the mobile network and another network. A Home Subscriber System (HSS) or some other database typically stores APNs. A Mobility Management Entity (MME) queries the HSS to determine the APN for the wireless communication to use for a media session. The MME then typically sends the APN to the wireless communication device over a base station indicating which packet data network gateway (P-GW) to use. The APNs may be determined based on services requested by users, such as Voice over Long Term Evolution (VoLTE), Internet Multimedia Subsystem (IMS), conversational video, real-time gaming, or some other service requested by users.

However, an APN received by the wireless communication device upon attachment may not be supported when the wireless communication device changes location. Therefore, the user device will not be able to use a previously given APN to access the network or use a specific service while located in the new area. This can lead to connection issues, such as misrouted calls when the user device assumes that a particular service is available. Unfortunately, there is no efficient or effective technique for providing a wireless communication device adequate service using a previously given APN when moving throughout different tracking areas.

TECHNICAL OVERVIEW

A mobility server in a wireless communication network controls Access Point Names (APNs) used by a User Equipment (UE) having a current APN data set. The mobility server receives a tracking area update from the UE indicating a UE Identifier (ID) and a current tracking area ID and responsively determines if the current tracking area ID is a new tracking area ID for the UE. If the current tracking area ID comprises the new tracking area ID for the UE, then the mobility server updates a tracking area database for the UE with the new tracking area ID for the UE and translates the UE ID and the current tracking area ID into a candidate APN data set. In response, the mobility server determines if the candidate APN data set is a new APN data set for the UE. If the candidate APN data set comprises the new APN data set for the UE, then the mobility server transfers an instruction for the UE to perform a wireless reattachment to obtain the candidate APN data set, receives an attachment request from the UE indicating the UE ID and the current tracking area ID, and responsively transfers the candidate APN data set for the UE to a data network gateway.

DETAILED DESCRIPTION

Figure 1:
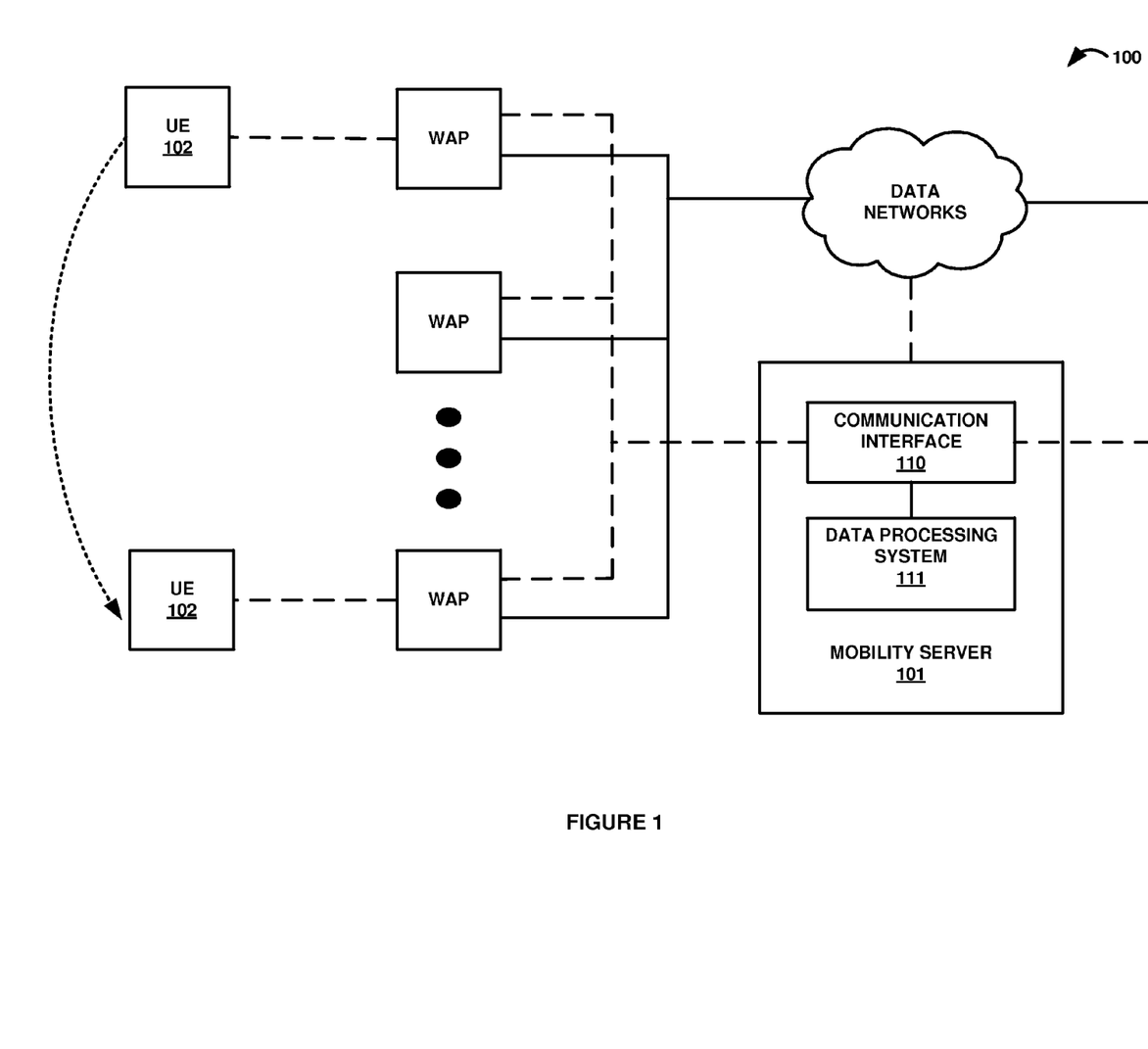
FIGS. 1-3 illustrate a communication system to control Access Point Names (APNs) used for a User Equipment (UE) having a current APN data set.

FIG. 1 illustrates communication system 100 to control Access Point Names (APNs) used for a User Equipment (UE) having a current APN data set. Communication system 100 includes mobility server 101, UE 102, wireless access points (WAPs), and data networks. Mobility server 101 includes communication interface 110 and data processing system 111. As indicated by the dashed lines, UE 102 exchanges signaling with WAPs and mobility server 101 over wireless communication links, such as air, space, or some other material that transports media. As indicated by the solid lines, WAPs share data with data networks over communication links, such as backhaul links. As indicated by the dotted lines, UE 102 moves from a first location to a second location.

Mobility server 101 controls APNs used by UE 102 having a current APN data set. Mobility server 101 comprises processing circuitry, software, memory, input/output components, and the like. Mobility server 101 could be a Mobility Management Entity (MME), a Radio Network Controller (RNC), a messaging server, or some other networking system control element.

Communication interface 110 comprises communication components, such as antennas, ports, amplifiers, filters, modulators, signal processors, and the like. Data processing system 111 may include general purpose central processing units, microprocessors, application specific processors, logic devices, and any other type of processing device.

UE 102 could be a phone, tablet computer, media player, intelligent machine, or some other apparatus having a wireless transceiver. UE 102 includes antennas, modulators, processing circuitry, memory devices, software, and bus interfaces. The processing circuitry comprises transistors, registers, and signal paths. The memory devices comprise flash drives, disc drives, read-only circuitry, or some other data storage media.

In operation, mobility server 101 receives a tracking area update from UE 102 indicating a UE Identifier (ID) and a current tracking area ID. UE 102 may send a mobility page to mobility server 101 with tracking area updates when UE 102 enters a new tracking area that is different from the tracking area UE 102 initially registered in, when a periodic tracking area update timer expires, or for some other reason. Mobility server 101 typically tracks the location of UE 102 within the network by receiving a tracking area update request message in a Non-Access Stratum (NAS) file from UE 102, and responsively transfers a tracking area update accept message to UE 102 in a NAS file.

The tracking area update includes data associated with UE 102, such as an electronic serial number (ESN), mobile station identifier (MSID), a network access identifier (NIA), or some other UE identifiers. The tracking area update also includes a current tracking area ID used to identify a tracking area, such as a mobile country code (MCC), a mobile network code (MNC), a tracking area code (TAC), or some other tracking area identifier.

In response to receiving the tracking area update from UE 102 indicating a UE ID and a current tracking area ID, mobility server 101 determines if the current tracking area ID is a new tracking area ID for UE 102. The tracking area ID may be different due to UE 102 moving to a new location. For example, UE 102 may be located in zone 1 when UE 102 is powered on, but then be in zone 2 before making a call.

If the current tracking area ID comprises the new tracking area ID for UE 102, then mobility server 101 updates a tracking area database for UE 102 with the new tracking area ID for UE 102. For example, if the previous tracking area ID indicates that UE 102 is located in zone 1, but the current tracking area ID indicates that UE 102 is located in zone 2, mobility server 101 would then update the tracking area database for UE 102.

In a next operation, mobility server 101 responsively translates the UE ID and the current tracking area ID into a candidate APN data set and determines if the candidate APN data set is a new APN data set for UE 102. An APN is the name of a gateway between a mobile network and another network, such as the name of a packet data network gateway (P-GW). Upon attachment, UE 102 typically receives an APN over an evolved NodeB (eNodeB) from an MME which queries a Home Subscriber System (HSS) to determine the APN for UE 102 to use for a media session. The APN data set may be determined based on services requested by users, such as Internet Multimedia Subsystem (IMS), conversational video, real-time gaming, or some other service requested by users.

If the candidate APN data set comprises the new APN data set for UE 102, then mobility server 101 transfers an instruction for UE 102 to perform a wireless reattachment to obtain the candidate APN data set and receives an attachment request from UE 102 indicating the UE ID and the current tracking area ID. For example, UE 102 may have previously registered with mobility server 101 using a service that was available in zone 1, but not in zone 2. In this example, when UE 102 enters a zone that does not support the service that UE 102 was previously registered for, a new APN data set will be needed when UE 102 attempts to initiate the media session. Therefore, mobile server 101 would send UE 102 a reattach message to force UE 102 to detach and reattach to mobile server 101.

In a final operation, mobility server 101 responsively transfers the candidate APN data set for UE 102 to a data network gateway. For example, the candidate APN data set may contain an APN associated with IMS services and when UE 102 reattaches to mobile server 101, mobile server 101 would transfer the candidate APN data set to the data network gateway. The data network gateway may be the same data network gateway used for the previously used APN data set for UE 102 or a different data network gateway.

In some examples, mobility server 101 comprises a Long Term Evolution (LTE) MME and the data network gateway comprises a P-GW. For example, the tracking area update is sent to an MME in a NAS file and stored in an HSS database. The APN data set transferred to UE 102 during attachment or reattachment may then indicate a P-GW for UE 102 to use to exchange data. In some examples, the instruction comprises a tracking area update acceptance. For example, mobility server 101 may indicate to UE 102 to detach and reattach in a NAS file in response to UE 102 sending a tracking area update to mobility server 101.

In some examples, the APNs comprise LTE APNs. In other examples, the current APN data set for UE 102 does not include a Voice over LTE (VoLTE) APN and the candidate APN data set does include the VoLTE APN in the new APN data set. For example, VoLTE services may not be available to UE 102 while attaching to a wireless access point in a first tracking area. However, once UE 102 moves into a new tracking area, the wireless access point may be capable of providing VoLTE services to UE 102 and therefore, UE 102 would reattach to the second wireless access point and receive the candidate APN data set associated with a P-GW which delivers VoLTE services. In other examples, the current APN data set for UE 102 does include a VoLTE APN and the candidate APN data set does not include the VoLTE APN in the new APN data set.

In some examples, the current APN data set for UE 102 does not include an IMS APN and the candidate APN data set does include the IMS APN in the new APN data set. In other examples, the current APN data set for UE 102 does include a an IMS APN and the candidate APN data set does not include the IMS APN in the new APN data set.

In some examples, the current APN data set for UE 102 does not include a video service APN and the candidate APN data set does include the video service APN in the new APN data set. In other examples, the current APN data set for UE 102 does include video service APN and the candidate APN data set does not include the video service APN in the new APN data set. For example, UE 102 may attempt to initiate a conversational video call while located in a first tracking area. However, the wireless access point in the first tracking area may not be capable of providing conversational video services and therefore, a conversational voice call will be initiated instead and UE 102 will be given an APN data set including conversational voice APNs. If UE 102 moves into a second tracking area with a wireless access point that does provide conversational video services, mobility server 101 would then force UE 102 to detach and reattach, and receive a new APN data set including conversational video APNs.

Figure 2:
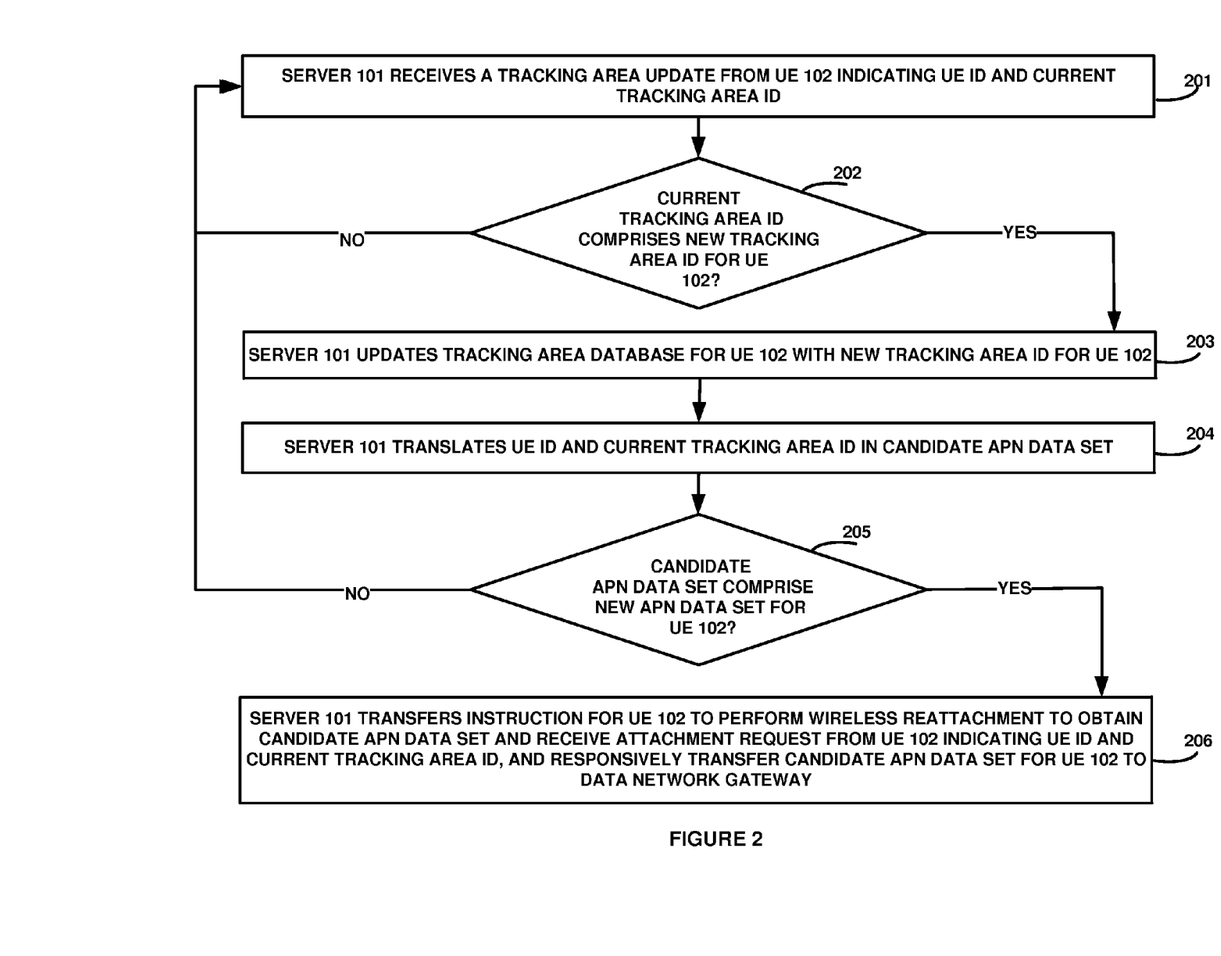

FIG. 2 is a flow diagram illustrating an operation of communication system 100 to control APNs used for a UE having a current APN data set. Mobility server 101 receives (201) a tracking area update from UE 102 indicating a UE Identifier (ID) and a current tracking area ID. In response to receiving the tracking area update from UE 102 indicating a UE ID and a current tracking area ID, mobility server 101 determines (202) if the current tracking area ID is a new tracking area ID for UE 102. If the current tracking area ID comprises the new tracking area ID for UE 102, the mobility server 101 updates (203) a tracking area database for UE 102 with the new tracking area ID for UE 102. In response, mobility server translates (204) the UE ID and the current tracking area ID into a candidate APN data set. Mobility server 101 determines (205) if the candidate APN data set is a new APN data set for UE 102. If the candidate APN data set comprises the new APN data set for UE 102, then mobility server 101 transfers (206) an instruction for UE 102 to perform a wireless reattachment to obtain the candidate APN data set and receives (206) an attachment request from UE 102 indicating the UE ID and the current tracking area ID and responsively transfers (206) the candidate APN data set for UE 102 to a data network gateway.

Figure 3:
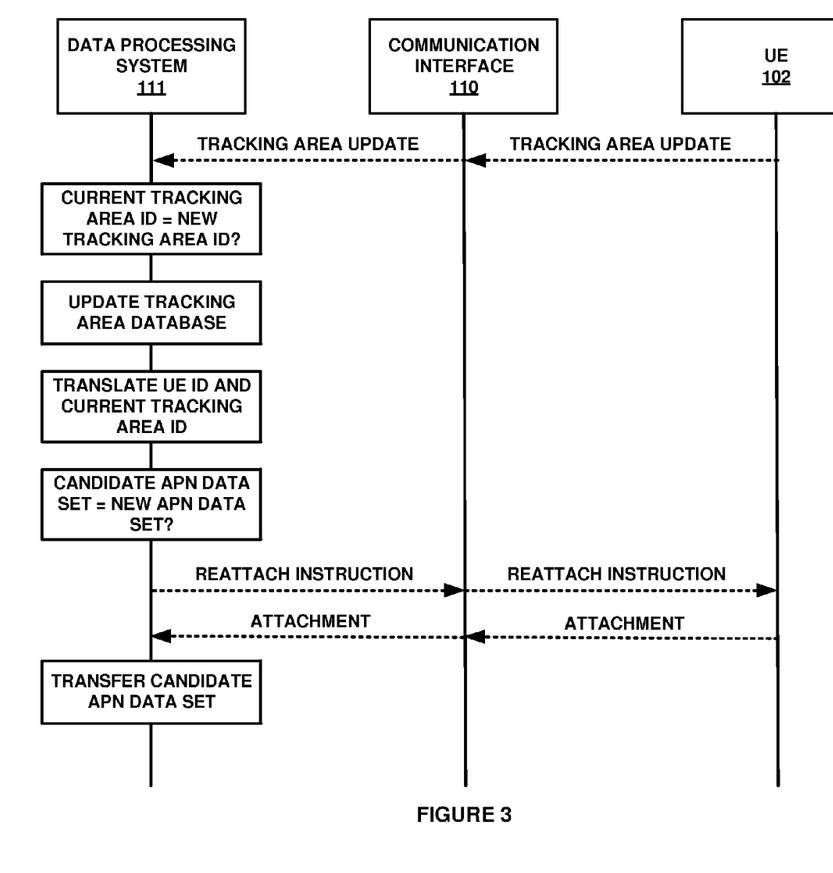

FIG. 3 is a sequence diagram illustrating the operation of communication system 100 to control APNs used by a UE having a current APN data set. Communication interface 110 receives a tracking area update from UE 102 indicating a UE ID and a current tracking area ID and transfers the tracking area update to data processing system 111. Data processing system 111 determines if the current tracking area ID is a new tracking area ID for UE 102. If the current tracking area ID comprises the new tracking area ID for UE 102, then data processing system 111 updates a tracking area data base for the UE with the new tracking area ID for UE 102. In response, data processing system 111 translates the UE ID and the current racking are ID into a candidate APN data set and determines if the candidate APN data set is a new APN data set for UE 102. If the candidate APN data set comprises the new APB data set for UE 102, then data processing system 111 drives communication interface 110 to transfer an instruction for UE 102 to perform a wireless reattachment to obtain the candidate APN data set. Data processing system 111 receives an attachment request from UE 102 indicating the UE ID and the current tracking area ID over communication interface 110. Data processing system 111 then drives communication interface 110 to transfer the candidate APN data set for UE 102 to a data network gateway.

Figure 4:
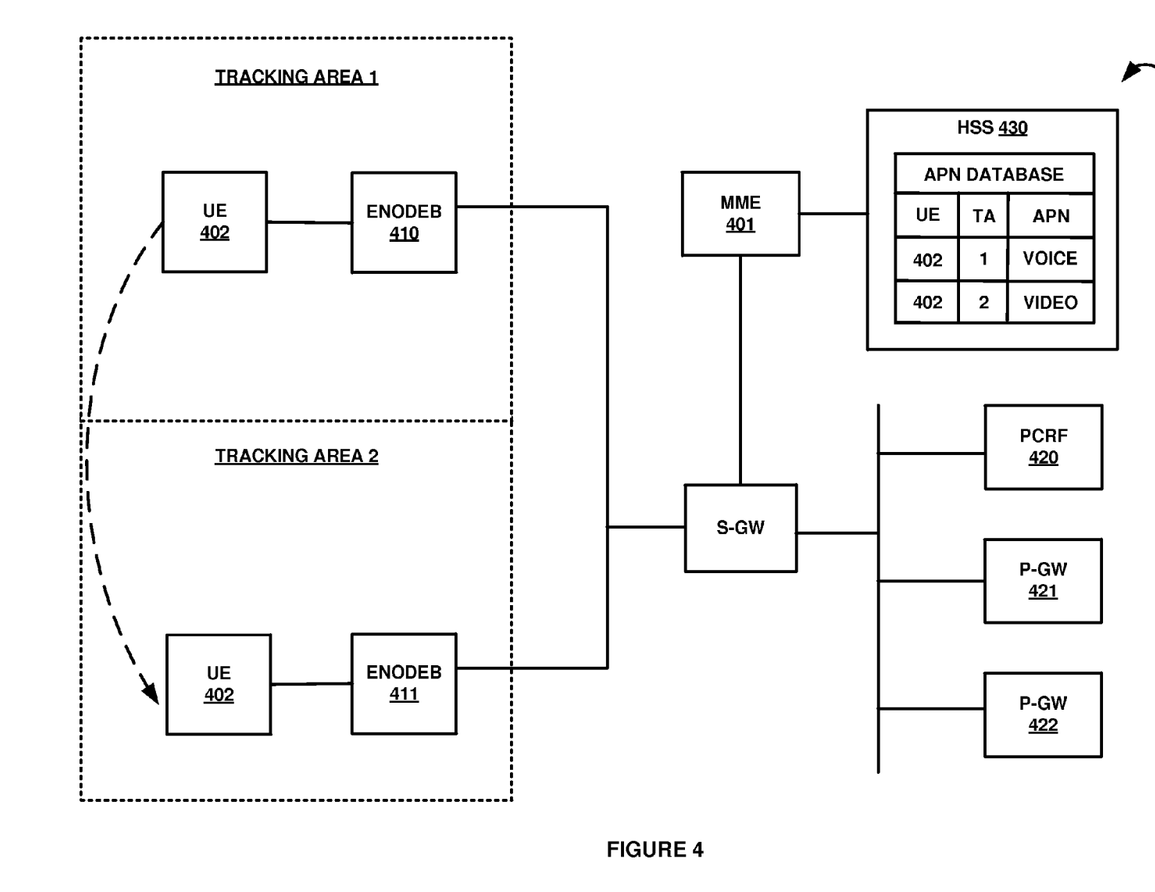
FIGS. 4-5 illustrate a Long Term Evolution (LTE) Mobility Management Entity (MME) to control APNs used for a UE having a current APN data set.
Figure 5:
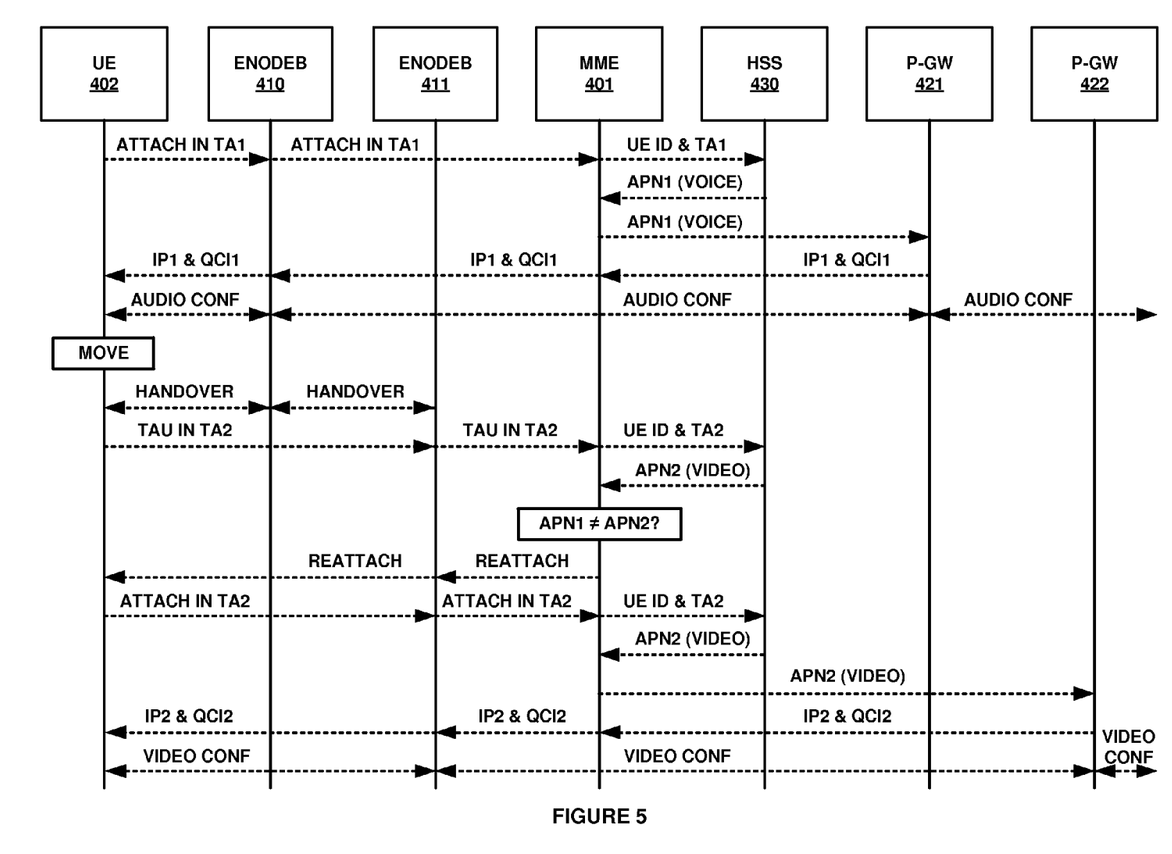

FIGS. 4-5 illustrate Long Term Evolution (LTE) communication system 400 to control APNs used for a UE having a current APN data set. LTE communication system 400 is an example of communication system 100, although communication system 100 may use alternative configurations and operations.

Referring to FIG. 4, LTE communication system includes UE 402, eNodeBs 410-411, S-GW, MME 401, HSS 430, and P-GWs 420-422. FIG. 4 also includes tracking area 1 and tracking area 2, as indicated by the dotted lines. UE 102 is initially located in tracking area 1 and communicates over eNodeB 410, which is located in tracking area 1. As indicated by the dashed line and arrow, UE 402 then moves into tracking area 2 and communicates over eNodeB 411, which is located in tracking area 2. HSS 430 includes APN database which associates UE IDs, tracking areas, and APN data sets.

FIG. 5 illustrates an operation of LTE communication system 400 to control APNs used for a UE having a current APN data set. UE 402 attaches to MME 401 over eNodeB 410 while located in tracking area 1. MME 401 then transfers the UE ID, tracking area ID, and any other relevant data associated with UE 402 to HSS 430 to store. In response, MME 401 queries HSS 430 to determine APN data set 1 associated with VoLTE services. MME 401 then transfers APN data set 1 to P-GW 421. In response, P-GW 421 transfers a first IP address and adds bearers, such as QCI 1 and QCI 9 to MME 401 and eNodeB 410, which then transfers the data to UE 402. UE 402 then exchanges audio data with another device over eNodeB 410 and P-GW 421.

Next, UE 402 moves into tracking area 2 and eNodeB 410 hands the audio media session over to eNodeB 411, which is located in tracking area 2. UE 402 then transfers a tracking area update to MME 401 over eNodeB 411 indicating that UE 402 is currently located in tracking area 2. MME 401 then transfers the UE ID, current tracking area ID, and any other relevant data associated with UE 402 to HSS 430. In response, HSS 430 transfers candidate APN data set 2 associated with conversational video services to MME 401. MME 401 then determines if candidate APN data set 2 is a new APN data set for UE 402.

In this example operation, candidate APN data set 2 is a new APN data set for UE 402. Therefore, MME 401 transfers an instruction to UE 402 to perform a wireless reattachment to obtain candidate APN data set 2 over eNodeB 411. UE 402 then detaches and reattaches to MME 401 over eNodeB 411. In response, MME 401 transfers the UE ID, tracking area ID, and any other relevant data associated with UE 402 to HSS 430. In response, HSS 430 transfers candidate APN data set 2 associated with conversational video services to MME 401. MME 401 then transfers APN data set 2 to P-GW 422. In response, P-GW 422 transfers a second IP address and adds bearers, such as QCI 2 and QCI 9 to MME 401 and eNodeB 411, which then transfers the data to UE 402. UE 402 then exchanges video data with another device over eNodeB 411 and P-GW 422.

Figure 6:
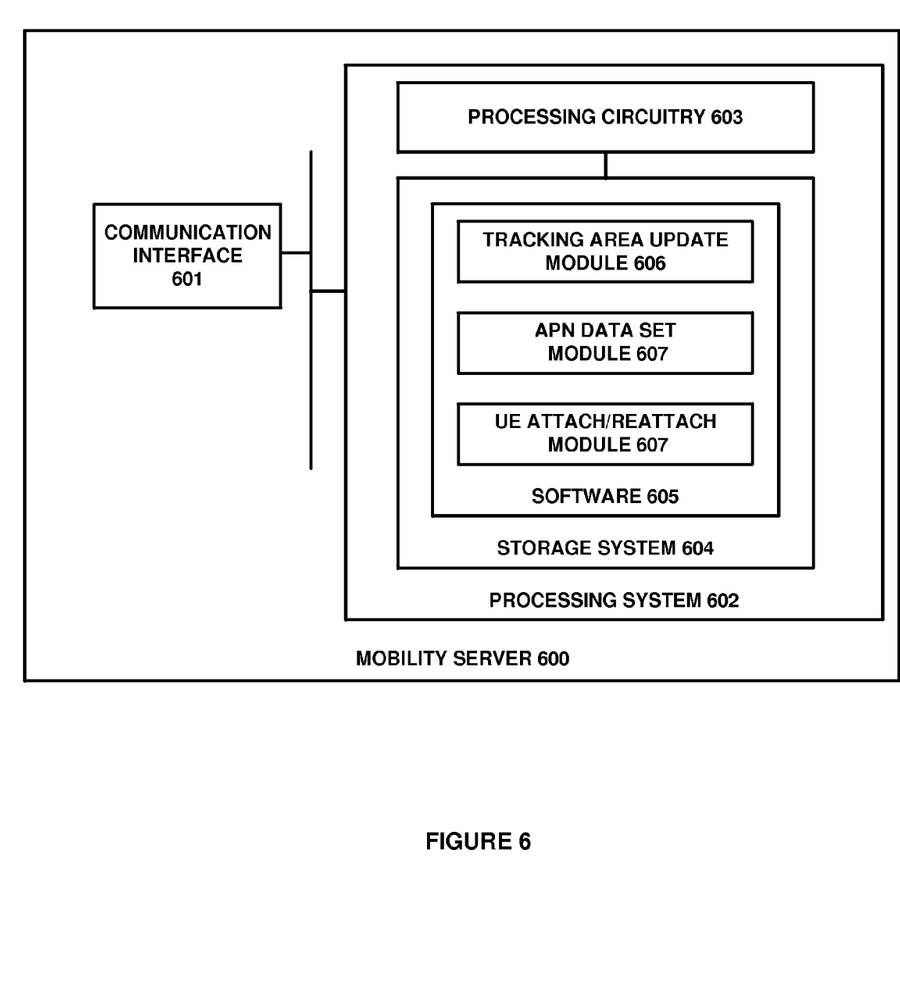
FIG. 6 illustrates a mobility server to control APNs used for a UE having a current APN data set.

FIG. 6 illustrates mobility server 600 to control APNs used by a UE having a current data set. Mobility server 600 is an example of mobility server 101 and LTE MME 401, although mobility server 101 and LTE MME 401 may use alternative configurations and operations. Mobility server 600 includes communication interface 601 and data processing system 602. Data processing system 602 is linked to communication interface 601.

Communication interface 601 comprises communication components, such as antennas, ports, amplifiers, filters, modulators, signal processors, and the like. Communication interface 602 receives a tracking area from a UE indicating a UE ID and a current tracking area ID. If the candidate APN data set also comprises the new APN data set for the UE, communication interface 602 also transfers an instruction for the UE to perform a wireless reattachment, receives an attachment request from the UE indicating the UE ID and the current tracking area ID, and in response, transfers the candidate APN data set for the UE to a data network gateway.

Data processing system 602 includes processing circuitry 603 and storage system 604 that stores software 605. Processing circuitry 603 comprises a microprocessor and other circuitry that retrieves and executes software 605 from storage system 604. Storage system 604 comprises a non-transitory storage medium, such as a disk drive, flash drive, data storage circuitry, or some other memory apparatus. Software 605 comprises computer programs, firmware, or some other form of machine-readable processing instructions. Software 605 includes tracking area update module 606 and APN data set module 607. Software 605 may further include an operating system, utilities, drivers, network interfaces, applications, or some other type of software. When executed by processing circuitry 603, software 605 directs processing system 602 to operate mobility server 600 as described herein.

In particular, when executed by processing circuitry 603, tracking area update module 606 directs processing circuitry 604 to determine if the current tracking area ID is a new tracking area ID for the UE, and if so, to update a tracking area database for the UE with the new tracking area ID for the UE. When executed by processing circuitry 603, APN data set module 607 directs processing circuitry 603 to translate the UE ID and the current tracking area ID into a candidate APN data set and determine if the candidate APN data set is a new APN data set for the UE. When executed by processing circuitry 603, UE attach/reattach module 608 directs processing circuitry 603 to drive communication interface 601 to transfer an instruction for the UE to perform a wireless reattachment to obtain the candidate APN data set, receive an attachment request from the UE indicating the UE ID and the current tracking area ID, and in response, transfer the candidate APN data set for the UE to a data network gateway.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a mobility server in a wireless communication network to control Access Point Names (APNs) used by a User Equipment (UE) having a current APN data set, the method comprising:
   receiving a tracking area update from the UE indicating a UE Identifier (ID) and a current tracking area ID;
   in response to receiving the tracking area update from the UE indicating a UE ID and a current tracking area ID, determining when the current tracking area ID is a new tracking area ID for the UE;
   when the current tracking area ID comprises the new tracking area ID for the UE, then updating a tracking area database for the UE with the new tracking area ID for the UE, and responsively translating the UE ID and the current tracking area ID into a candidate APN data set and determining when the candidate APN data set is a new APN data set for the UE; and
   when the candidate APN data set comprises the new APN data set for the UE, then transferring an instruction for the UE to perform a wireless reattachment to obtain the candidate APN data set and receiving an attachment request from the UE indicating the UE ID and the current tracking area ID and responsively transferring the candidate APN data set for the UE to a data network gateway.

2. The method of claim 1 wherein the mobility server comprises a Long Term Evolution (LTE) Mobility Management Entity (MME) and the data network gateway comprises a Packet Data Network Gateway (P-GW).

3. The method of claim 1 wherein the APNs comprises Long Term Evolution (LTE) APNs.

4. The method of claim 1 wherein the instruction comprises a tracking area update acceptance.

5. The method of claim 1 wherein the current APN data set for the UE does not include a Voice over Long Term Evolution (VoLTE) APN and the candidate APN data set does include the VoLTE APN to comprise the new APN data set.

6. The method of claim 1 wherein the current APN data set for the UE does include a Voice over Long Term Evolution (VoLTE) APN and the candidate APN data set does not include the VoLTE APN to comprise the new APN data set.

7. The method of claim 1 wherein the current APN data set for the UE does not include an Internet Multimedia Subsystem (IMS) APN and the candidate APN data set does include the IMS APN to comprise the new APN data set.

8. The method of claim 1 wherein the current APN data set for the UE does include an Internet Multimedia Subsystem (IMS) APN and the candidate APN data set does not include the IMS APN to comprise the new APN data set.

9. The method of claim 1 wherein the current APN data set for the UE does not include a video service APN and the candidate APN data set does include the video service APN to comprise the new APN data set.

10. The method of claim 1 wherein the current APN data set for the UE does include video service APN and the candidate APN data set does not include the video service APN to comprise the new APN data set.

11. A mobility server in a wireless communication network to control Access Point Names (APNs) used by a User Equipment (UE) having a current APN data set comprising:
   a communication transceiver configured to receive a tracking area update from the UE indicating a UE Identifier (ID) and a current tracking area ID;
   a data processing system configured to determine when the current tracking area ID is a new tracking area ID for the UE, and when the current tracking area ID comprises the new tracking area ID for the UE, then to update a tracking area database for the UE with the new tracking area ID for the UE and in response, to translate the UE ID and the current tracking area ID into a candidate APN data set and determine when the candidate APN data set is a new APN data set for the UE; and
   when the candidate APN data set comprises the new APN data set for the UE, then the communication transceiver configured to transfer an instruction for the UE to perform a wireless reattachment to obtain the candidate APN data set and receive an attachment request from the UE indicating the UE ID and the current tracking area ID, and in response, to transfer the candidate APN data set for the UE to a data network gateway.

12. The mobility server of claim 11 wherein the mobility server comprises a Long Term Evolution (LTE) Mobility Management Entity (MME) and the data network gateway comprises a Packet Data Network Gateway (P-GW).

13. The mobility server of claim 11 wherein the APNs comprises Long Term Evolution (LTE) APNs.

14. The mobility server of claim 11 wherein the instruction comprises a tracking area update acceptance.

15. The mobility server of claim 11 wherein the current APN data set for the UE does not include a Voice over Long Term Evolution (VoLTE) APN and the candidate APN data set does include the VoLTE APN to comprise the new APN data set.

16. The mobility server of claim 11 wherein the current APN data set for the UE does include a Voice over Long Term Evolution (VoLTE) APN and the candidate APN data set does not include the VoLTE APN to comprise the new APN data set.

17. The mobility server of claim 11 wherein the current APN data set for the UE does not include an Internet Multimedia Subsystem (IMS) APN and the candidate APN data set does include the IMS APN to comprise the new APN data set.

18. The mobility server of claim 11 wherein the current APN data set for the UE does include an Internet Multimedia Subsystem (IMS) APN and the candidate APN data set does not include the IMS APN to comprise the new APN data set.

19. The mobility server of claim 11 wherein the current APN data set for the UE does not include a video service APN and the candidate APN data set does include the video service APN to comprise the new APN data set.

20. The mobility server of claim 11 wherein the current APN data set for the UE does include video service APN and the candidate APN data set does not include the video service APN to comprise the new APN data set.

* * * * *